US008389114B2

(12) United States Patent
Luzinov et al.

(10) Patent No.: US 8,389,114 B2
(45) Date of Patent: Mar. 5, 2013

(54) ULTRAHYDROPHOBIC SUBSTRATES

(75) Inventors: Igor A. Luzinov, Central, SC (US); Philip J. Brown, Williamston, SC (US); Killugudi L. Swaminatha Iyer, Nedlands (AU); Viktor Z. Klep, Central, SC (US); Bogdan Z. Zdyrko, Leverett, MA (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 13/160,709

(22) Filed: Jun. 15, 2011

(65) Prior Publication Data

US 2011/0262709 A1 Oct. 27, 2011

Related U.S. Application Data

(62) Division of application No. 11/396,308, filed on Mar. 31, 2006, now Pat. No. 7,985,451.

(60) Provisional application No. 60/667,453, filed on Apr. 1, 2005.

(51) Int. Cl.

| | |
|---|---|
| ***D06N 7/04*** | (2006.01) |
| ***B32B 5/16*** | (2006.01) |

(52) U.S. Cl. ......... 428/323; 428/141; 428/143; 428/221

(58) Field of Classification Search .................... 442/74, 442/75, 79, 85, 86; 428/141, 143, 221, 323
See application file for complete search history.

(56) References Cited

U.S. PATENT DOCUMENTS

| | | | | |
|---|---|---|---|---|
| 2004/0185260 | A1 * | 9/2004 | Luzinov et al. | 428/413 |
| 2004/0208791 | A1 * | 10/2004 | Extrand | 422/99 |

* cited by examiner

*Primary Examiner* — Matthew Matzek
(74) *Attorney, Agent, or Firm* — Dority & Manning, P.A.

(57) ABSTRACT

Disclosed is a process for modification of a substrate so as to form an ultrahydrophobic surface on the substrate. Also disclosed are surface-modified substrates that can be formed according to the disclosed processes. The process includes attachment of a multitude of nano- and/or submicron-sized structures to a surface to provide increased surface roughness. In addition, the process includes grafting a hydrophobic material to the surface in order to decrease the surface energy and decrease wettability of the surface. The combination of increase surface roughness and decreased surface energy can provide an ultrahydrophobic surface on the treated substrate.

14 Claims, 2 Drawing Sheets

ULTRAHYDROPHOBIC SUBSTRATES

CROSS REFERENCE TO RELATED APPLICATION

This application is a divisional application of U.S. patent application Ser. No. 11/396,308, issued as U.S. Pat. No. 7,985,451, having a filing date of Mar. 31, 2006, which claims benefit of U.S. Provisional Application Ser. No. 60/667,453 filed Apr. 1, 2005.

FEDERALLY SPONSORED RESEARCH

The government may have rights in this invention pursuant to NSF Award Number EEC-9731680 and to Department of Commerce National Textile Center Award Number M01-CL03.

BACKGROUND OF THE INVENTION

The ability to form a material surface possessing self-cleaning characteristics, i.e., capable of repelling contamination, has been a major goal for many years in many fields of study including fiber/textile technologies as well as technologies dealing with countless other types of organic as well as inorganic surfaces. Primarily, research in this area has been directed to methods for forming materials possessing surfaces that display very limited wettability, which can help to provide a self-cleaning surface to a substrate.

As with many other questions in many other fields, nature has already developed an efficient solution to this problem. First dubbed the "lotus effect" and described by Dr. Wilhelm Barthlott of the University of Bonn (see, for example, "Purity of the sacred lotus, or escape from contamination in biological surfaces," *Planta* (1997) 202:1-8), the external surfaces of many plants and animals have a rough surface structure combined with an ideal surface chemistry to create self-cleaning, super-repellant surfaces. For example, the self-cleaning characteristics found on the leaf surface of the *N. nucifera* (the white lotus) and the wing surface of many insects combine a topology describing a high degree of surface roughness with a chemistry that exhibits low surface energy to create a surface upon which practically all particulates are removed when subjected to water, e.g., rain, independent of the size and chemical nature of the particles.

Attempts have been made to replicate the lotus effect on various surfaces. For example, Youngblood, et al. prepared ultrahydrophobic polypropylene surfaces by simultaneously etching the polypropylene and sputtering poly(tetrafluoroethylene) using inductively coupled radio frequency argon plasmas (*Macromolecules* 1999, 32, 6800-6806). Another group, Kim and Kim of UCLA, have utilized lithographic techniques to create ultrahydrophobic silicon-based surfaces including nano-sized channel configurations formed on the surfaces (*IEEE MEMS* 2002, 479-482). While such methods have shown capability for creating a rough surface on particular materials, the methods are fairly limited in application and also require expensive and complicated processing techniques.

What is needed in the art are improved surface modification techniques applicable to a wide variety of materials so as to provide ultrahydrophobic, e.g., self-cleaning, surface characteristics to materials and products.

SUMMARY OF THE INVENTION

In one embodiment, the invention is directed to a method for modifying the surface of a substrate. The method can include, for instance, grafting a plurality of structures to a substrate surface. The addition of the structures to the substrate surface can increase the surface roughness of the substrate. The method can also include grafting a hydrophobic material to the substrate surface. The combination of the increased surface roughness and the increased hydrophobicity of the surface can provide an ultrahydrophobic surface to the substrate. In particular, the modified substrate surface can describe both a water contact angle and a water receding angle of greater than about 150°.

In one embodiment, the plurality of structures and the hydrophobic material can be indirectly grafted to the substrate surface. For example, a cross-linked polymeric anchoring layer can be grafted directly to the substrate surface, and then the plurality of structures can be grafted to the anchoring layer. Thus, the plurality of structures can be indirectly grafted to the substrate surface via the anchoring layer.

Additionally, a second polymer layer can be formed over the anchoring layer. For example, a second cross-linked polymer layer can be formed that can overlay both the anchoring layer and the plurality of structures grafted to the anchoring layer. Following formation of this second polymer layer, a hydrophobic material can be grafted to the second polymer layer. Thus, the hydrophobic material can be indirectly grafted to the substrate surface via the second polymer layer.

The invention is also directed to the surface modified substrates that can be formed according to the disclosed processes. In particular, the surface modified substrates can include the plurality of structures and the hydrophobic material that have been directly or indirectly grafted to the substrate. The structures grafted to the substrate surface can generally have a cross-section of less than about 1 micrometer, or less than 500 nanometers in another embodiment. In addition, the average distance between individual structures grafted to the substrate can be less than about three times the cross-section of the individual structures.

The grafted materials can be any suitable material. For instance, the structures to be grafted to the substrate can be metallic or carbon-based. In addition, the structures can have any shape. In one particular embodiment, the individual structures can have a high aspect ratio, i.e., greater than one.

Similarly, the substrate can be any suitable material. For example, substrates that can be modified according to the disclosed invention can be fibrous, polymeric, synthetic materials, or textiles, among other possibilities.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
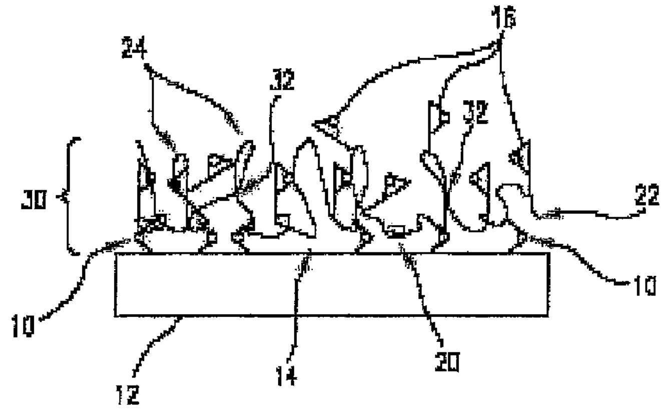
FIG. 1 is a representation of an epoxy-containing polymeric anchoring layer bound to a substrate surface.

Repeat use of reference characters in the present specification and drawings is intended to represent the same or analogous features or elements of the present invention.

DETAILED DESCRIPTION OF REPRESENTATIVE EMBODIMENTS

Definition of Terms

The term "graft" is herein defined to refer to a process wherein one material can be affixed to another material. For instance, materials may be considered to be grafted to one another according to any process known in the art including, for example, adsorption, absorption, bond formation (covalent, ionic, or any other bond type), polymerization, or any other method suitable to affix one material to another from melt, gas phase, or liquid phase, as desired.

The terms "ultrahydrophobic" and "superhydrophobic" in reference to a surface are intended to refer herein to a surface in which both the receding and advanced water contact angles are greater than about 150°.

The wavelength of surface roughness is herein defined to refer to the distance between maxima of adjacent deviations from planarity on a surface.

The term "micro-sized" is herein defined to refer to structures of a size from about 1 micrometer (μm) to about 100 μm.

The term "submicron-sized" is herein defined to refer to structures of a size from about 500 nm to about 1 μm.

The term "nano-sized" is herein defined to refer to structures of a size less than 500 nm.

Detailed Description

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used in another embodiment to yield a still further embodiment.

The present invention is generally directed to a process for modification of a substrate so as to form an ultrahydrophobic surface on the substrate. The present invention is also directed to the surface-modified substrates that can be formed according to the disclosed processes. More specifically, according to the present invention, an ultrahydrophobic surface can be developed on a substrate through development of both a rough surface topology and a low surface tension chemistry on the surface. For instance, a rough surface topology can be developed on a surface by grafting a plurality of nano- and/or micro-sized structures to the substrate. In addition, a hydrophobic material can be grafted to the substrate either before, during or following the grafting of the nano-sized structures. The hydrophobic material can decrease the surface energy of the substrate. When combined, a substrate including both a rough surface topology and a low surface energy can be formed that can exhibit ultrahydrophobic characteristics.

Generally, any substrate may be surface modified according to the present invention, either organic or inorganic. A non-exhaustive list of possible materials suitable for modification according to the processes of the present invention can include, for example, various fiber and textile materials, including natural and synthetic fibrous materials; polymeric materials, including polyolefins such as polyethylene and polypropylene based materials, and including semi-crystalline polymers such as ultra high molecular weight polyethylene, polyethylene terephthalate (PET), silicon resins, and nylons; inorganic materials such as silicon, glass, and metal substrates including titanium, alumina, gold, silver, and alloy materials; and composite materials including fiber/resin composites such as fiberglass. Moreover, when considering fibrous materials, the fibrous material itself may be treated according to the present invention. Alternatively, individual fibers may be treated according to the present invention prior to formation of a woven or nonwoven fibrous material. Substrates can be of any desired morphology including membranes, solid or hollow fibers (e.g., capillaries), laminates, and the like.

According to the present invention, a multitude of nano- and/or micro-sized structures can be located on a surface so as to increase the surface roughness of the substrate. It is generally understood that the presence of a relatively high degree of surface roughness can provide for at least two important contact effects between the rough surface and materials that can come into contact with the rough surface. First, the existence of a high degree of surface roughness can provide for a very small contact area between the surface and a contaminant, e.g., a particulate or an aqueous liquid droplet, that can come into contact with the surface. As such, adhesion between the contaminant and the surface can be minimized due to the minimal contact area between the two. In addition, the surface roughness can also facilitate the trapping of air beneath a portion of the contaminant. For instance, when considering a liquid droplet coming into contact with the rough surface, an air boundary layer can form between portions of the droplet and the surface, and this air boundary layer can further increase the contact angle between the droplet and the surface. Moreover, both of these effects can be further enhanced when combined with a surface chemistry describing a low surface energy. Thus, when a solid particulate or a liquid droplet, e.g., a water droplet, contacts the surface, it can easily roll or slide off of the surface due to these combined effects. Moreover, when considering a liquid droplet, as the droplet rolls or slides off of the of the surface and in so doing encounters a solid particle on the surface, the particle can preferentially adhere to the passing droplet and can simultaneously be removed from the surface with the liquid, as adhesion between the surface and the particle has been minimized as described above. Thus, the particle can preferentially adhere to the liquid and be "cleaned" from the rough surface.

Generally, any size and shape of nano-sized and/or micro-sized structures can be utilized to develop the desired surface topology on the substrate. In general, structures of between about 5 nm and about 1 μm, or even larger in other embodiments, for instance up to about 10 μm can be applied to the surface to develop the desired surface topology.

The application of micro-sized structures to a surface, for instance microstructures between about 1 μm and about 10 μm in size, can beneficially improve the hydrophobicity of a surface as compared to the flat surface. The topological effects of the disclosed process can be further improved, however, through the application of submicron- and/or nano-sized particles to the surface. For example, in one embodiment, micro-sized materials can be applied to a surface in combination with smaller nano- and/or submicron-sized structures. In other embodiments, a surface can be modified through the inclusion of only the smaller structures, i.e., submicron and/or nano-sized structures. In one embodiment, nano-sized structures having a cross-section of between about 5 nm and about 400 nm can be grafted to a surface. In another embodiment, structures having a cross sectional dimension (e.g., diameter) of between about 100 nm and about 130 nm can be grafted to a surface.

The structures to be grafted to a substrate are not limited as to shape. For example, the structures can be rods, cones, tubes, spheres, filaments, wires, mesh, platelets, and the like, as well as structures with no particular defined shape, i.e., structures having a random and/or amorphous shape. Optionally, the structures can include a mixture of different shapes. When considering structures that describe a high aspect ratio, e.g., filaments, wires, individual lengths of a mesh, and so on, the structures can have any length, but should have at least one cross-sectional dimension in the micron, sub-micron, or nano-sized range as herein defined to provide the desired surface topology to the substrate.

In certain embodiments the shape and size of the structures to be located on the surface can be particularly designed, for instance to promote a flow pattern on the substrate. For example, the structures can have an aspect ratio greater than one, for instance tubes, rods or cone-shaped structures can be granted to a surface. High aspect ratio structures can be located on a surface so as to form a regular or irregular pattern on the substrate, for instance a post pattern in which the structures length dimension extends away from the surface.

In another embodiment, the structures can have an extremely high aspect ratio, for instance the structures can be nano-wires, or nano-filaments. Extremely high aspect ratio structures can be grafted a surface to form a pattern of surface roughness describing lines or channels across the surface, A linear micro- or nano-pattern can be beneficial, for instance, in embodiments involving the controlled movement of liquid through and/or over materials. For example, a linear pattern can be utilized to establish a directed flow pattern on a surface of a membrane, pipe, capillary, and the like.

The structures can generally be formed of any suitable material and according to any formation process as is generally known in the art. For example, in one embodiment, the structures can be carbon based. For instance, the structures can be carbon nanotubes, carbon nanowires, buckyballs, and the like. Other materials suitable for forming the structures can include, without limitation, ceramics, metals, polymers, clays, or any other organic or inorganic material that can be formed to micro- or nano-sized structures.

In one embodiment, the structures can be functionalized, for instance to facilitate the placement and/or binding of the structures at a surface. For example, the structures can include static surface charge, so as to provide a slight electrostatic repulsion between individual structures. This can improve distribution of the structures at the surface of the materials through prevention of agglomerization and clustering of the structures.

In order to attain suitable surface topology, a plurality of structures can be located on a surface of the substrate with a fairly high concentration distribution. In one embodiment, the structures can be located on the surface such that the distance between adjacent structures can be, on average, less than the cross-sectional area of the structures themselves. This level of high concentration is not a requirement, however, and in other embodiments, the average distance between structures can be somewhat greater. For example, in general, the average wavelength, $\lambda$, of the surface roughness, i.e., the average distance between the maxima of adjacent structures, can be less than about 3 d, wherein the distance d is defined as a cross sectional measure of a single structure. In another embodiment, $\lambda$ can be between about d and about 3 d.

In some embodiments, for example when considering certain organic substrates, it can be beneficial to pre-treat the substrate, for instance via an oxidation pre-treatment, to increase the reactivity of the substrate surface and enhance the grafting of either the structures themselves or an intermediate binding material to the substrate. For example, some polymeric surfaces such as poly(ethylene terephthalate), polyethylene, and polypropylene surfaces may be pretreated prior to grafting additional materials to the surface to increase the reactivity of the surface. For instance, a substrate surface may be pretreated via an oxidation process so as to be more reactive to materials to be directly grafted to the surface. The surface may be oxidized to increase reactivity thereof through any suitable method including, but not limited to, corona discharge, chemical oxidation, flame treatment, plasma treatment, or UV radiation. Pre-treatment of the substrate is not a requirement, however, as many substrate materials will already comprise suitable functionality at the surface to be processed as herein described.

The method utilized to graft the structures to the substrate surface can depend primarily upon the nature of the two materials. For instance, in some embodiments, the nature of the structures as well as that of the substrate surface can be such so as to facilitate the direct grafting of the structures across the surface through, for example, plasma deposition, CVD deposition, direct adsorption of the nanostructures to the substrate surface, and the like.

While the structures can be directly bound to the substrate surfaces in some embodiments, in other embodiments, an intermediate material can be bound directly to the substrate and the structures can be bound indirectly to the substrate via this intermediate material. For example, in one preferred embodiment, a reactive anchoring layer can be applied to the substrate and the structures can then be indirectly grafted to the substrate via this reactive anchoring layer. Utilization of a reactive anchoring layer that can be bound directly to the substrate surface can facilitate the grafting of the structures to the substrate, and can also facilitate grafting of other materials to the substrate before, during, or following the grafting of the structures.

One possible reactive anchoring layer can be a cross-linked polymeric layer formed of one or more relatively high molecular weight polymers. For instance, a reactive polymer having a number average molecular weight of at least about 2,000 may be used to form the anchoring layer. Even larger polymers can be utilized in other embodiments, for instance, a reactive polymer having a number average molecular weight over about 100,000 may be utilized to form the anchoring layer on the substrate surface.

The polymers can include reactive functionality so as to provide for binding of the polymer to the substrate, cross-linking of the polymer to form the cross-linked anchoring layer, grafting of the plurality of the structures to the substrate via the anchoring layer, and optionally, grafting of additional materials to the substrate via the anchoring layer. In one particular embodiment, the anchoring layer can include reactive epoxy functionality. This can prove beneficial as epoxy is highly reactive under a wide variety of conditions. For instance, epoxy can react with any of carboxy, hydroxy, amino, thiol, or anhydride functional groups under a wide variety of conditions. In one preferred embodiment, a reactive anchoring layer including epoxy functionality such as that described in U.S. Patent Application Publication 2004/0185260 to Luzinov, et al., which is incorporated herein by reference in its entirety, can be applied to the substrate prior to application of the structures. For example, an anchoring layer formed of epoxidized polybutadiene, epoxidized polyisoprene, epoxidized poly(glycidyl methacrylate) (PGMA) or any other high molecular weight epoxy-containing polymer can be used to form the reactive anchoring layer.

Beneficially, as epoxy is quite reactive, an epoxy-containing polymeric layer can be readily formed on most substrate materials via existing substrate functionality. Thus, preprocessing of a substrate prior to deposition and formation of a reactive anchoring layer will often not be required. Moreover, the particular bond formed between the substrate material and the polymer can depend upon the functionality on the substrate and as such, the polymer may be bound to the substrate surface via covalent bonds, hydrogen bonds, ionic bonds, or any other strong or weak bond. Accordingly, some embodiments of the invention can be directed to formation of an essentially permanent ultrahydrophobic coating on the substrate, e.g., via covalent bonding of the layers and materials described herein to a substrate, and other embodiments can be directed to temporary formation of the ultrahydrophobic characteristics on a substrate, e.g., via utilization of temporary or weak bonds to graft the materials to the substrate.

A polymer forming a reactive anchoring layer may be applied to a substrate surface according to any suitable methodology. For example, a substrate may be sprayed with or immersed in a solution including the polymer. For instance, a fairly dilute solution including the polymer may be formed, and the substrate may be dip-coated in the solution. In one particular embodiment, a solution may be formed containing from about 0.02% to about 0.5% of the reactive polymer by weight in a suitable solvent, e.g. an organic solvent, and the substrate may be dip-coated in the solution. In other embodiments, however, less dilute solutions of the polymer may be utilized. Optionally, a polymer may be applied to the substrate surface via a finishing process during a substrate formation process. For example, a polymer may be applied to a substrate during a spin-finishing operation of an extrusion process, e.g., a fiber or film extrusion process. In one particular embodiment, a polymeric solution can be applied to a textile substrate in a conventional textile finishing process, for instance employing a standard pad-dry-cure system as is generally known in the art.

Following application of the polymeric material to the surface, the coated substrate can be cured, for instance to promote adhesion of the polymer to the substrate surface and/or to promote cross-linking of the polymer. For example, the coated substrate can be cured at a temperature of about 110° C., though particular temperatures and cure times can depend upon the particular substrate materials as well as the polymers used in forming the reactive anchoring layer, as is generally known in the art. In one embodiment, a coated polymeric substrate can be cured at a temperature of about 150° C. for about two minutes.

FIG. 1 illustrates one embodiment of a reactive anchoring layer generally 30 as may be utilized to indirectly graft the structures to a substrate. As can be seen in FIG. 1, an epoxy-containing polymer can be grafted to the surface 14 of the substrate 12 at multiple points 10 along the length of the polymer where epoxy groups 16 of the polymer have reacted with functionalities on the surface 14 of the substrate 12. In this manner, a secure attachment can be formed between the epoxy-containing polymer and the substrate surface 14. In addition, as the epoxy-containing polymer can be attached to the substrate surface at multiple random points 10 along the length of the polymer, the individual polymer can form trains 20, tails 22, and loops 24 that can extend the height of the polymer above the substrate surface providing a depth to the anchoring layer 30, as can be seen in FIG. 1.

Not all of the epoxy functionality of the high molecular weight polymers will be reacted at the surface of the substrate. Specifically, the epoxy-containing polymers applied to the surface of the substrate can retain an amount of epoxy functionality on the polymer following the initial grafting of the polymer. As such, in addition to binding the polymer directly to the substrate surface, epoxy functionality of the polymer can also cross-link the polymers. Cross-linking agents as are generally known in the art can be utilized to cross-link the layer as well. A non-limiting list of exemplary cross-linking agents can include ethylene diamine, hydrazine, dicarboxylic acids and the like that can be utilized to cross-link the polymers. In any case, and as can be see in FIG. 1, the polymers of the layer self-cross-link as at 32 as well as cross-link adjacent polymers to each other and the polymers applied to the substrate can form a cross-linked anchoring layer 30 on the substrate.

Due to the high level of reactivity of the polymers used in forming the reactive anchoring layer, the anchoring layer can retain reactivity following formation. For example epoxy functionality can be retained in the cross-linked layer following initial application and curing of the layer. This remaining reactive functionality can provide a relatively simple route for indirectly binding additional materials, and in particular, a plurality of structures, to the surface.

Optionally, the reactive polymeric anchoring layer may include more than one reactive functionality. For instance, a polymer utilized in forming the reactive anchoring layer can include a first functionality, such as epoxy, for grafting the polymers to the substrate, cross-linking of the polymers, and optionally, grafting of subsequent materials to the layer that exhibit reactivity with that first functionality. The anchoring layer can also include additional functionality that can be utilized for specific reaction with a second material to be grafted. In one embodiment, this second reactivity can be provided at a controlled concentration so as to graft a material, e.g., the structures, to the surface with a predetermined concentration distribution. For example, the anchoring layer can include an amino functionality and the structure can bind at the amino group via, e.g., acid chloride, acid anhydride, carboxylic acid groups, and the like. Optionally, the retained functionality of the anchoring layer can be altered for grafting a material thereto. For instance, a retained epoxy functionality can be converted to an amino functionality, and the structures can then preferentially bind or otherwise absorb at the amino functionality.

Optionally, the anchoring layer can include a reactivity that can be utilized to locate the structures with a predetermined orientation in relation to the surface. For example, a reactivity of the anchoring layer can be particularized for reaction with a moiety located at only one end of a nanotube or nanorod, so as to locate the nanostructures on the surface with a post-like configuration.

In one embodiment, a second reactivity can be provided on the polymer through utilization of a copolymer. For instance, a copolymer formed of a first component including epoxy functionality and a second component including a second reactive moiety, such as a reactive aromatic moiety, for instance, can be formed. Generally, any suitable reactive polymer including homopolymers or copolymers including block, graft, alternating, or random copolymers can be used in forming the reactive anchoring layer. For instance, at least one of the repeating monomer units included in a copolymer can include one or more epoxy functionalities, and any other monomers) can carry epoxy functionality, one or more other reactive functionalities, or no reactive functionality, as desired. Accordingly, the anchoring layer can include multiple reactive functionalities following formation.

In another embodiment, the anchoring layer can be formed from a polymer blend. For example, a blend including an epoxidized polymer blended with one or more additional polymers that can exhibit an epoxy or a different reactivity can be used to form the reactive anchoring layer. In one particular embodiment, a blend of epoxidized PGMA and poly(2-vinylpyridine)(PVP) can be used to form the reactive anchoring layer.

Blends of polymers, copolymers, and the like can be advantageously used in certain embodiments of the present invention to improve control over subsequent application of materials to the substrate surface. For example, through utilization of a blend of polymers or one or more copolymers in forming a reactive anchoring layer, overall density of the grafted structures can be controlled as the structures can bind to a limited number of the reactive functionalities available on the layer, leaving other reactive functionalities available for grafting additional materials to the surface.

Following formation of a reactive polymeric anchoring layer on a substrate surface, the layer can a include an amount of retained reactive functionality, for instance retained epoxy functionality as illustrated in FIG. 1, or a retained secondary functionality as described above, that can be utilized for grafting additional materials to the anchoring layer, and in particular, for grafting the structures that can provide the desired surface topology to the substrate.

Figure 2:
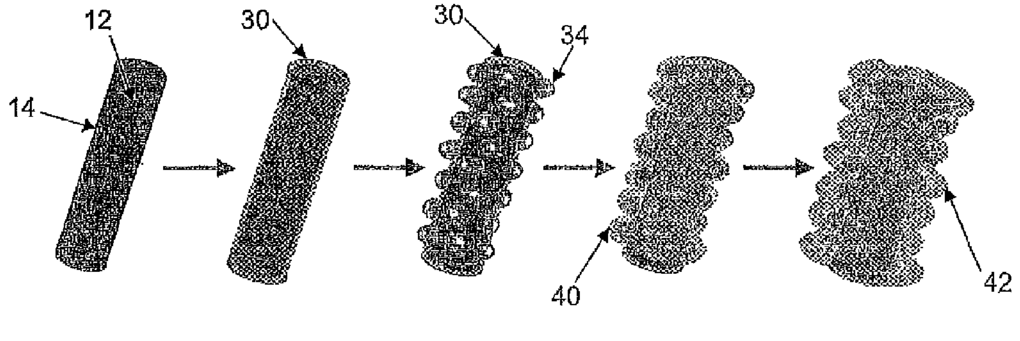
FIG. 2 is a schematic representation of one possible embodiment of a process as herein described for achieving the lotus effect on a fiber.

Referring to FIG. 2, one embodiment of the disclosed process is illustrated. According to this particular embodiment, a fibrous substrate 12 can be coated at the surface 14 with a reactive anchoring layer 30 as described above and illustrated in greater detail in FIG. 1. Following formation of the reactive anchoring layer 30, a plurality of nanostructures 34 can be distributed and adsorbed across the surface of the reactive anchoring layer. Thus, the surface topology of the substrate can now exhibit an increased surface roughness.

In order to complete the desired replication of the lotus effect on the substrate, the substrate surface can be further modified to exhibit increased hydrophobicity. For example, additional materials can be grafted to the modified surface that can decrease the surface energy of the substrate. Accordingly, the combination of the increased surface roughness with the low surface energy can provide a substrate surface that can exhibit ultrahydrophobic characteristics.

Accordingly, prior to, during, or following application of the nanostructures to the substrate surface, a hydrophobic material can be grafted to the substrate surface. This hydrophobic material can be grafted directly to the substrate and/or the structures, can be grafted to the reactive anchoring layer to which the structures are also grafted, or can be grafted to a second reactive polymer layer that can be applied to the substrate following attachment of the structures to the substrate. In one embodiment, a hydrophobic polymer can be grafted directly or indirectly to the substrate and then cross-linked so as to form a hydrophobic polymeric layer on the substrate surface.

Referring again to FIG. 2, following application of a plurality of nanostructures 34 to the substrate surface 14 via the reactive anchoring layer 30, a second reactive polymer layer 40 can be applied to the substrate 12. Application of a second reactive polymer layer 40 to the substrate 12 can serve many beneficial purposes. For example, second reactive polymer layer 40 can serve to coat both the nanostructures 34 and the underlying anchoring layer 30, so as to provide a single homogeneous material across the surface of the substrate. In addition, second reactive polymer layer 40 can include reactivity capable of bonding to the underlying anchoring layer 30 and optionally to both the underlying anchoring layer 30 and the nanostructures 34, and thus can tightly sandwich the nanostructures 34 within the two layers 30, 40, and increase the strength of adherence of the nanostructures 34 to the substrate 12. Moreover, second reactive polymer layer 40 can provide a relatively simple route for additional surface modification of the substrate, and in particular, for application of a material to increase the hydrophobic characteristics of the substrate.

Second reactive polymer layer 40 can be the same as or different from reactive anchoring layer 30. For instance, in one embodiment, reactive polymer layer 40 can be an epoxidized anchoring layer such as that described in U.S. Patent Application Publication No. 2004/0185260 to Luzinov, et al., previously incorporated herein by reference, and can have similar formulation as the reactive anchoring layer 30. Optionally, however, the second layer 40 can vary from reactive anchoring layer 30 as to materials, reactivities, etc. In any case, reactive polymer layer 40 can include reactive functionality so as to bond to anchoring layer 30, at the exposed surfaces of anchoring layer 30, optionally to also bond with the applied structures 34 and, upon cross-linking, can form a cross-linked polymeric layer that can encapsulate the nanostructures 34 between the two layers 30, 40. Moreover, following formation of reactive polymer layer 40, the layer 40 can retain an amount of reactive functionality, for example, retained epoxy functionality, that can be utilized for attachment of additional materials and in particular, hydrophobic materials, to the second reactive polymer layer 40.

In one embodiment, hydrophobic materials may be grafted to the layer 40 by direct reaction between the hydrophobic material and the reactive functionality remaining on the reactive layer 40. For example, referring again to FIG. 2, hydrophobic homopolymers, or random, graft, or block copolymers may be attached to and cross-linked on the substrate surface via direct attachment of the hydrophobic material to the polymer layer 40 to form a hydrophobic layer 42 on the substrate. Exemplary hydrophobic materials that can be grafted to the substrate via reactive layer 40 can include hydrophobic polymeric materials including, for example, polystyrenes, silicones, fluorocarbons, aromatic hydrocarbons, aliphatic hydrocarbons, fluorinated aromatic or aliphatic compounds, and the like.

In another embodiment, the hydrophobic materials can be indirectly grafted to layer 40. For instance, a polymerization initiator can be grafted to the reactive layer 40, and then the desired monomer(s) can be polymerized at the surface according to any standard polymerization process as is generally known in the art.

In one embodiment of the present invention, the substrate 12 can be grafted with two or more different materials at the reactive polymer layer 40 to form a material having a hybrid surface. For example, the substrate 12, including reactive polymer layer 40, can be contacted with two or more different materials, at least one of which is a hydrophobic material, either at the same time or in a step-by-step process, as desired, such that both materials may be grafted onto the reactive layer 40. For example, one material may be directly grafted and another material may be grafted through a polymerization process. Alternatively, all of the materials may be grafted through the same process, i.e., direct grafting of the materials or graft polymerization. For example, in one embodiment, a first polymerization initiator may be attached at a portion of the reactive functionality remaining on reactive polymer layer 40, followed by a graft polymerization process. Then, a second polymerization initiator, which may be the same as or different from the first polymerization initiator, may be attached to retained functionality on the layer 40 and a second graft polymerization reaction may be carried out. According to one embodiment, such a process could be utilized to particularly control the wetting and self-cleaning characteristics of the surface area of the substrate, for example through location of a hydrophobic material over one predetermined area of the substrate. According to such an embodiment, flow patterns of a liquid over the substrate could be better controlled.

Additional materials that can be grafted to the substrate surface, in addition to hydrophobic materials, can be utilized to provide surface characteristics to the substrate. For instance, functionalized polymers or macromolecules such as biomolecules (proteins, DNA, polysaccharides, members of specific binding pairs, and the like), polyethylene glycol, polyacrylates, polymethacrylates, poly(vinyl pyridine), or polyacrylamide, dyes, and the like may be grafted to the substrate via reactive layer 40 to provide a surface that exhibits desirable characteristics (e.g., antibiotic or other self-sanitizing characteristics, particular colors, targeted molecular recognition and binding, and the like) in addition to the water repelling and self-cleaning properties of the ultrahydrophobic surface.

The disclosed surface modification processes may be utilized in a wide variety of applications. A non-limiting list of exemplary applications for the ultrahydrophobic surface modified products could include, for example, products displaying one or more of the following: increased dirt repellency, decreased adhesiveness, improved flow control and/or selectivity, improved molecular recognition, colloidal stability, dispersivity and/or solvent resistance, decreased flow resistance, and the like. There are also many medical and biological applications for the disclosed ultrahydrophobic materials. For example, ultrahydrophobic materials inserted into blood vessels, body cavities, etc. could better prevent thrombosis at the surface following implantation.

In one particular application, wettability and self-cleaning characteristics of fibers and textile materials may be improved through the disclosed surface modification techniques so as to improve, for example, repellency of dirt or other contaminants, permanent press properties, and quickness of drying of the products.

Reference now will be made to various embodiments of the invention, one or more examples of which are set forth below. Each example is provided by way of explanation of the invention, not as a limitation of the invention. In fact, it will be apparent to those skilled in the art that various modifications and variations may be made of this invention without departing from the scope or spirit of the invention.

Example

A 70/30 by weight PGMA/PVP (epoxidized poly(glycidyl methacrylate)/poly(2-vinylpyridine)) solution from MEK (0.2 wt %) was formed and applied to a silicon wafer. The modified substrate was cured at 110° C. for 10 minutes to aid self cross-linking of the epoxy groups of PGMA. An SPM topography image of a 1 μm×1 μm area of the silicon substrate coated with the 70/30 PGMA/PVP blend is in shown in FIG. 3A.

Coated substrates were then exposed to a suspension of silver nanoparticles (110 nm-130 nm in diameter) that had been held in deionized water at low ionic strength overnight in order to maintain substantial long-range electrostatic repulsion between particles and consequently minimize clustering of the nanoparticles on the surface of the substrates.

Figure 3:
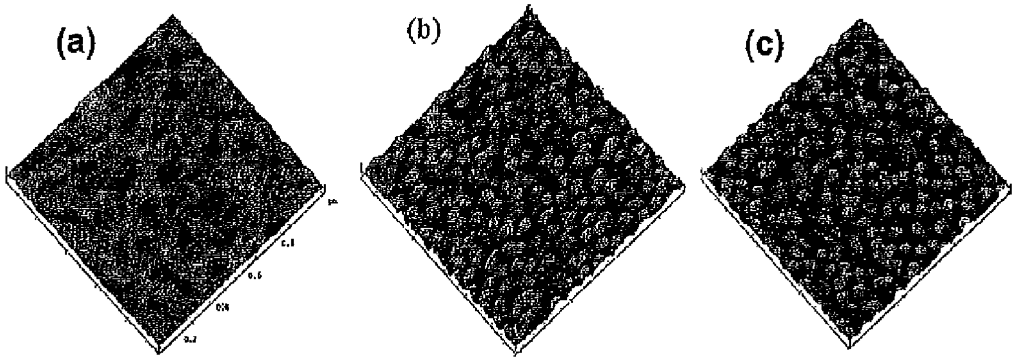
FIG. 3A-3C are scanning probe microscope (SPM) topography images of silicon wafers modified according to one embodiment of the present invention.

Following adsorption of the nanoparticles to the surface, a further layer of PGMA was applied via dip coating. This layer was cured in the same manner as the first layer. This sandwich layer coating was found to be quite robust, and its integrity appeared to be strengthened by cross-linked epoxy functionalities between the two anchoring layers. FIG. 3B is a 3 μm×3 μm SPM image of the nanoparticles sandwiched between the initial anchoring PGMA/PVP layer and the second PGMA layer.

A reactive hydrophobic carboxy-terminated polystyrene (PS) was then grafted to the substrate via the retained epoxy functionality of the top PGMA layer. Specifically, the PS was grafted at 150° C. Another curing process, identical to the previous curing process, enabled the hydrophobic coating to react with the reactive surface upper layer of PGMA. A 3 μm×3 μm section of the modified wafer, including the polystyrene layer, is shown in FIG. 3C.

The PS/PGMA/NANOPARTICLE/PVP/PGMA system thus formed showed excellent mechanical integrity. For example, the particles did not detach at high temperature (during the PS grafting) or in toluene under ultrasonic treatment.

Example 2

Figure 4:
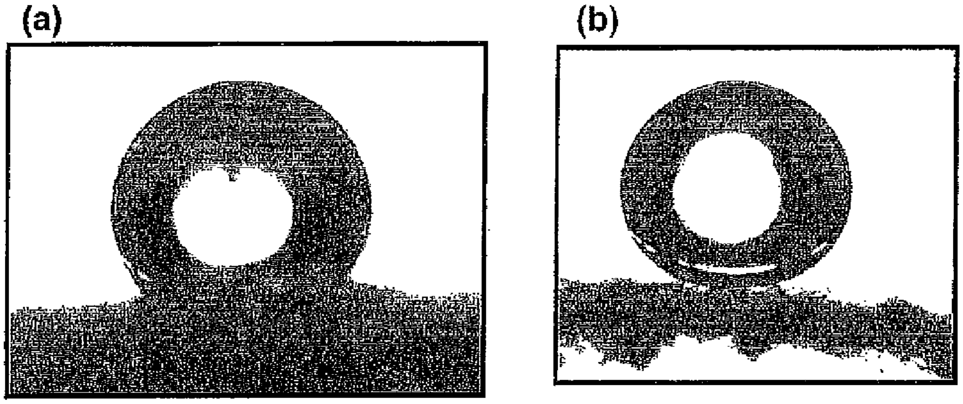
FIGS. 4A and 4B illustrate the difference in water contact angle on a control surface (FIG. 4A) and a surface modified according to one embodiment of the present invention (FIG. 4B).

A polyester fabric was modified according to a process as described above for the silicon wafer of Example 1, except that the polyester fabric was first subjected to plasma discharge in the low intensity mode for 10 minutes in order to activate the surface of the fibers forming the fabric. Following activation, a PVP/PGMA layer, silver nanoparticles, a PGMA layer, and a PS layer were applied to the fabric, as described above. As a control, a second fabric was modified with only the polystyrene layer, and no nanoparticles were applied to the surface. Static contact angle analysis was performed on both fabrics, and results are shown in FIG. 4. The contact angle of the fabric was obtained as 113°+3.6 for the control surface (FIG. 4A) and 157°±3 for PS/nanoparticle multilayer system (FIG. 4B). Increase in the contact angle was believed to be due to the limited contact of water with the PS layer in combination with the effect of the entrapped air between the coated surface and the water. This synergistic effect of the hydrophobicity of PS and the roughness caused by the nanoparticles indeed resulted in a contact angle beyond the superhydrophobic boundary.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A surface-modified substrate comprising:

a cross-linked anchoring layer that is an intermediate layer bound directly to the surface of a substrate;

a plurality of structures having a cross-section of from about 5 nanometers to about 1 micrometer indirectly grafted to the surface of the substrate via the intermediate layer;

wherein the average distance between individual structures is less than about three times the cross-section of the individual structures; and a hydrophobic material grafted to the surface of the substrate; wherein the surface-modified substrate has a receding water contact angle greater than about 150° and has an advancing water contact angle greater than about 150°.

2. The surface-modified substrate of claim 1, wherein the cross-linked anchoring layer comprises cross-linked poly(glycidyl methacrylate).

3. The surface-modified substrate of claim 1, further comprising a cross-linked polymer layer overlaying the plurality of structures.

4. The surface-modified substrate of claim 3, wherein the hydrophobic material is grafted to the cross-linked polymer layer.

5. The surface-modified substrate of claim 1, wherein the hydrophobic material is a cross-linked hydrophobic polymer.

6. The surface-modified substrate of claim 1, wherein the structures have a cross-section of from about 5 nanometer to about 500 nanometers.

7. The surface-modified substrate of claim 1, wherein the structures are metallic.

8. The surface-modified substrate of claim 1, wherein the structures are carbon-based.

9. The surface-modified substrate of claim 1, wherein the structures have an aspect ratio greater than one.

10. The surface-modified substrate of claim 1, wherein the average distance between individual structures is less than the cross-section of the individual structures.

11. The surface-modified substrate of claim 1, wherein the substrate is a fibrous substrate.

12. The surface-modified substrate of claim 1, wherein the substrate is a woven or nonwoven textile.

13. The surface-modified substrate of claim 1, wherein the substrate comprises a polymer.

14. The surface-modified substrate of claim 13, wherein the substrate comprises a synthetic polymer.

* * * * *